(12) United States Patent
Sumi et al.

(10) Patent No.: US 10,375,379 B2
(45) Date of Patent: Aug. 6, 2019

(54) 3D DISPLAY DEVICE

(71) Applicant: InnoLux Corporation, Miao-Li County (TW)

(72) Inventors: Naoki Sumi, Miao-Li County (TW); Pei-Hsuan Chiang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 231 days.

(21) Appl. No.: 14/953,528

(22) Filed: Nov. 30, 2015

(65) Prior Publication Data

US 2017/0085865 A1  Mar. 23, 2017

Related U.S. Application Data

(60) Provisional application No. 62/219,762, filed on Sep. 17, 2015.

(51) Int. Cl.
*H04N 13/04* (2006.01)
*G06T 1/60* (2006.01)
(Continued)

(52) U.S. Cl.
CPC ......... *H04N 13/305* (2018.05); *H04N 13/111* (2018.05); *H04N 13/31* (2018.05);
(Continued)

(58) Field of Classification Search
CPC ..... H01L 27/11582; H01L 2924/00014; H01L 27/11556; H01L 27/1157; H01L 27/11524; H01L 27/11573; H01L 2924/0002; H01L 2924/00; H01L 27/11565; H01L 27/11575; H01L 23/5226; H01L 21/28282; H04N 13/0029; H04N 13/0404; H04N 13/0497; H04N 13/0048; H04N 13/0055; H04N 13/0409; H04N 13/0447; H04N 13/0059; H04N 13/0468; H04N 13/0454;
(Continued)

(56) References Cited

U.S. PATENT DOCUMENTS 6,795,241 B1    9/2004  Holzbach
7,119,965 B1 *  10/2006  Rolland ............ G02B 27/0172
                                          359/630
(Continued)

FOREIGN PATENT DOCUMENTS

CN    102707448 A    10/2012
CN    204334844 U    5/2015

*Primary Examiner* — Leron Beck
*Assistant Examiner* — Kehinde Abimbola
(74) *Attorney, Agent, or Firm* — Bacon & Thomas, PLLC

(57) ABSTRACT

A 3D display device is disclosed, which comprises: a display panel and a modulating unit disposed on the display panel and comprising plural columnar elements. The display panel comprises: a substrate; plural horizontal electrode lines disposed on the substrate and substantially arranged in parallel; and plural vertical electrode lines disposed on the substrate and substantially arranged in parallel, wherein the vertical electrode lines are interlaced with the horizontal electrode lines to define plural pixel units. In addition, the columnar elements are slanted at a slant angle to an extension direction of the vertical electrode line of the display panel, and the slant angle is in a range from 60 degree to 85 degree.

14 Claims, 15 Drawing Sheets

(51) Int. Cl.
| | |
|---|---|
| *H04N 13/305* | (2018.01) |
| *H04N 13/31* | (2018.01) |
| *H04N 13/324* | (2018.01) |
| *H04N 13/111* | (2018.01) |
| *H04N 13/373* | (2018.01) |
| *H04N 13/317* | (2018.01) |
| *H04N 13/398* | (2018.01) |
| *H04N 13/351* | (2018.01) |
| *H04N 13/00* | (2018.01) |
| *H04N 13/128* | (2018.01) |

(52) U.S. Cl.
CPC ......... *H04N 13/317* (2018.05); *H04N 13/324* (2018.05); *H04N 13/351* (2018.05); *H04N 13/373* (2018.05); *H04N 13/398* (2018.05); *H04N 13/128* (2018.05); *H04N 2013/0081* (2013.01)

(58) Field of Classification Search
CPC ....... H04N 13/0456; G06F 2203/04112; G06F 3/044; H05K 9/00; H05K 9/0096; G02B 26/101; G02B 27/2214; G02B 26/02; G02B 27/225; G02B 2027/011; G02B 2027/0132; G02B 2027/0178; G02B 26/0816; G02B 27/017; G02B 27/0172; G02B 27/26; G02B 5/30; G02B 7/34
See application file for complete search history.

(56) References Cited

U.S. PATENT DOCUMENTS

| | | | | |
|---|---|---|---|---|
| 7,440,059 | B2* | 10/2008 | Hashimoto | G02F 1/133553 349/113 |
| 8,723,929 | B2 | 5/2014 | Chen et al. | |
| 8,780,188 | B2* | 7/2014 | De Zwart | G02B 27/2214 348/59 |
| 9,052,518 | B2* | 6/2015 | Raymond | G02B 3/005 |
| 9,251,613 | B2* | 2/2016 | Hsun | G06T 11/60 |
| 9,383,588 | B2* | 7/2016 | Raymond | G02B 3/005 |
| 9,482,791 | B2* | 11/2016 | Raymond | G02B 3/005 |
| 9,596,458 | B2* | 3/2017 | Smith | G02B 27/2214 |
| 2003/0142257 | A1* | 7/2003 | Chaudhari | G02F 1/133753 349/129 |
| 2005/0062920 | A1* | 3/2005 | Chaudhari | G02F 1/133753 349/129 |
| 2005/0157227 | A1* | 7/2005 | Hashimoto | G02F 1/133553 349/113 |
| 2006/0001789 | A1* | 1/2006 | Ahn | G02F 1/133345 349/42 |
| 2007/0086090 | A1 | 4/2007 | Wang et al. | |
| 2007/0247708 | A1* | 10/2007 | De Zwart | H04N 13/317 359/463 |
| 2008/0225114 | A1* | 9/2008 | De Zwart | H04N 13/317 348/51 |
| 2009/0231719 | A1* | 9/2009 | Powell | G02B 27/0101 359/630 |
| 2011/0001803 | A1* | 1/2011 | De Zwart | H04N 13/317 348/51 |
| 2011/0038043 | A1 | 2/2011 | Lin et al. | |
| 2011/0075256 | A1* | 3/2011 | De Zwart | G02B 27/225 359/463 |
| 2011/0164036 | A1* | 7/2011 | De Zwart | G02B 27/2214 345/419 |
| 2012/0200916 | A1 | 8/2012 | Bent-Gourley | |
| 2013/0006525 | A1* | 1/2013 | Stroila | G01C 21/20 701/434 |
| 2013/0050625 | A1* | 2/2013 | Jung | B32B 3/02 349/128 |
| 2013/0194252 | A1 | 8/2013 | Kim | |
| 2013/0194521 | A1 | 8/2013 | Whangbo et al. | |
| 2013/0242219 | A1* | 9/2013 | Yun | G02F 1/13306 349/43 |
| 2013/0342664 | A1* | 12/2013 | Smith | G02B 27/2214 348/58 |
| 2014/0029094 | A1* | 1/2014 | Kroon | G09G 3/3208 359/463 |
| 2014/0063382 | A1* | 3/2014 | Wu | G02B 27/2214 349/15 |
| 2014/0168549 | A1* | 6/2014 | Murao | G02B 27/2264 349/15 |
| 2014/0178029 | A1* | 6/2014 | Raheman | H04N 5/772 386/224 |
| 2014/0192284 | A1* | 7/2014 | Takagi | G02F 1/134363 349/15 |
| 2014/0267453 | A1* | 9/2014 | Lo | G09G 3/3648 345/690 |
| 2015/0042770 | A1* | 2/2015 | Barenbrug | H04N 13/0447 348/51 |
| 2015/0117777 | A1* | 4/2015 | Hsun | G06T 11/60 382/173 |
| 2016/0014398 | A1* | 1/2016 | Kroon | G02B 27/225 348/59 |
| 2016/0054240 | A1* | 2/2016 | Uncovsk | G01N 23/203 250/307 |
| 2016/0182900 | A1* | 6/2016 | Leng | G09G 3/20 348/51 |
| 2016/0373730 | A1* | 12/2016 | Kroon | G02B 27/225 |
| 2017/0155895 | A1* | 6/2017 | Kroon | H04N 13/0497 |
| 2017/0206842 | A1* | 7/2017 | An | G09G 3/3291 |

* cited by examiner

FIG. 10A

| R | R |
|---|---|
| G | G |
| B | B |
| R | R |
| G | G |
| B | B |

FIG. 10B

| R | R |
|---|---|
| G | G |
| B | B |
| W | W |
| R | R |
| G | G |
| B | B |
| W | W |

FIG. 10C

| R | B |
|---|---|
| G | W |
| B | R |
| W | G |

FIG. 10D

| R | W | R | W |
|---|---|---|---|
| G | B | G | B |
| R | W | R | W |
| G | B | G | B |

| | | | | | | | | | | | | | |
|---|---|---|---|---|---|---|---|---|---|---|---|---|---|
| 1 | 5 | 9 | 13 | 17 | 21 | 25 | 29 | 1 | 5 | 9 | 13 | | |
| 30 | 2 | 6 | 10 | 14 | 18 | 22 | 26 | 30 | 2 | 6 | 10 | | |
| 27 | 31 | 3 | 7 | 11 | 15 | 19 | 23 | 27 | 31 | 3 | 7 | | |
| 24 | 28 | 32 | 4 | 8 | 12 | 16 | 20 | 24 | 28 | 32 | 4 | | |
| 17 | 21 | 25 | 29 | 1 | 5 | 9 | 13 | 17 | 21 | 25 | 29 | | |
| 14 | 18 | 22 | 26 | 30 | 2 | 6 | 10 | 14 | 18 | 22 | 26 | | |
| 11 | 15 | 19 | 23 | 27 | 31 | 3 | 7 | 11 | 15 | 19 | 23 | | |
| 8 | 12 | 16 | 20 | 24 | 28 | 32 | 4 | 8 | 12 | 16 | 20 | | |
| 1 | 5 | 9 | 13 | 17 | 21 | 25 | 29 | 1 | 5 | 9 | 13 | | |
| 30 | 2 | 6 | 10 | 14 | 18 | 22 | 26 | 30 | 2 | 6 | 10 | | |
| 27 | 31 | 3 | 7 | 11 | 15 | 19 | 23 | 27 | 31 | 3 | 7 | | |
| 24 | 28 | 32 | 4 | 8 | 12 | 16 | 20 | 24 | 28 | 32 | 4 | | |

//# 3D DISPLAY DEVICE

CROSS REFERENCE TO RELATED APPLICATION

This application claims the benefit of filing date of U.S. Provisional Application Ser. No. 62/219,762, entitled "Ultra wide view 3D display" filed Sep. 17, 2015 under 35 USC § 119(e)(1).

BACKGROUND

1. Field of the Invention

The present disclosure relates to a 3D display device and, more particularly, to an ultra-wide view 3D display device.

2. Description of Related Art

Currently, image display technologies have been developed from 2D display to 3D display. One of the well-known 3D display devices is a glasses-type 3D display device (also called as stereoscopic display device). However, many users feel uncomfortable when wearing the glasses to watch images on the conventional glasses-type 3D display device. Hence, the glasses-free 3D display device (also called as glassless 3D display device, naked-eye 3D display device, and autostereoscopic display device) is further developed to solve the problem that might be occurred when using the conventional glasses-type 3D display device.

Even though some manufactures have provided naked-eye 3D display devices, the viewing angles thereof are still limited. Hence, the developed naked-eye 3D display devices still cannot be well commercialized.

Therefore, it is desirable to provide an improved naked-eye 3D display device to solve the problem of narrow viewing angles.

SUMMARY

The object of the present disclosure is to provide a 3D display device, which can provide multi-view images to user's eyes to achieve the purpose of autostereoscopic display.

To achieve the object, the 3D display device of the present disclosure comprises: a display panel, comprising: a substrate; plural horizontal electrode lines disposed on the substrate and substantially arranged in parallel; and plural vertical electrode lines disposed on the substrate and substantially arranged in parallel, wherein the vertical electrode lines cross the horizontal electrode lines to define plural pixel units arranged in an array; and a modulating unit disposed on the display panel and comprising plural columnar elements, wherein the columnar elements are slanted at a slant angle to an extension direction of the vertical electrode line of the display panel, and the slant angle is in a range from 60 degree to 85 degree.

In the 3D display device of the present disclosure, widths of the pixel units along extension directions of the horizontal electrode lines are equal to or larger than widths of the pixel units along extension directions of the vertical electrode lines.

Additionally, the 3D display device of the present disclosure may further comprise an imaging rendering circuit, which comprises: a 3D image buffer, receiving a 3D video frame and outputting a 3D image data; a depth analyzer, receiving the 3D video frame and outputting a depth image; a depth image buffer, connecting to the depth analyzer, receiving the depth image and outputting a depth data; a view number image generator, connecting to the depth analyzer, receiving the depth image and outputting an N view number image data; a view number image buffer, connecting to the view number image generator, receiving the N view image data and outputting the N view image data; and a 3D pixel rendering means, connecting to the 3D image buffer, the depth image buffer and the view number image buffer, receiving the 3D image data, the depth data and the N view image data, and outputting a mixed 3D video frame to the display panel.

In the 3D display device of the present disclosure, the columnar elements of the modulating unit has a slant angle of 60-85 degree to the vertical electrode line of the display panel; and the widths of the pixel units along the extension directions of the horizontal electrode lines are equal to or larger than the widths of the pixel units along the extension directions of the vertical electrode lines. Therefore, an increased viewing angle along the extension directions of the horizontal electrode lines can be achieved; and especially, the viewing angle of the 3D display device of the present disclosure can be improved to be more than 80 degree. In addition, the 3D display device of the present disclosure may further comprise an imaging rendering circuit. Through this imaging rendering circuit, the number of the views can be temporally or spatially adjusted with regard to the changes of the depth of the input 3D video frame and other information input by the user; therefore, the user can perceive a desirable 3D display image having a desirable depth with a rendering in a short time or with low power consumption.

Other objects, advantages, and novel features of the disclosure will become more apparent from the following detailed description when taken in conjunction with the accompanying drawings.

BRIEF DESCRIPTION OF THE DRAWINGS

FIGS. 10A to 10D are perspective views showing possible arrangements of the pixel units in the 3D display device according to one embodiment of the present disclosure.

FIG. 11 is a perspective view showing repeating blocks of pixel units in the 3D display device according to one embodiment of the present disclosure.

DETAILED DESCRIPTION OF THE PREFERRED EMBODIMENT

The present disclosure has been described in an illustrative manner, and it is to be understood that the terminology used is intended to be in the nature of description rather than of limitation. Many modifications and variations of the present disclosure are possible in light of the above teachings. Therefore, it is to be understood that within the scope of the appended claims, the disclosure may be practiced otherwise than as specifically described.

In the following embodiments of the present disclosure, horizontal electrode lines and vertical electrode lines are formed by straight metal lines. However, in other embodiments of the present disclosure, the horizontal electrode lines and the vertical electrode lines may not be the straight metal lines, and may be bent or curved metal lines. Hence, in the following embodiments of the present disclosure, the slant angle of the columnar elements and the widths of the pixel units are defined by the extension directions of the horizontal electrode lines and the vertical electrode lines.

In the following embodiments of the present disclosure, the pixel unit can also refer the sub-pixel units.

In addition, in the following embodiment of the present disclosure, the extension direction of the horizontal electrode lines is defined as a horizontal direction X, and the extension direction of the vertical electrode lines is defined as a vertical direction Y.

Furthermore, in the following embodiments of the present disclosure, the slant angle of the columnar element refers to an included angle between the extension direction of the vertical electrode lines and the boundary between two adjacent columnar elements, or an included angle between the extension direction of the vertical electrode lines and the longitudinal axis of the columnar element, or an included angle between the extension direction of the vertical electrode lines and the focal line of the columnar elements.

Figure 1A:
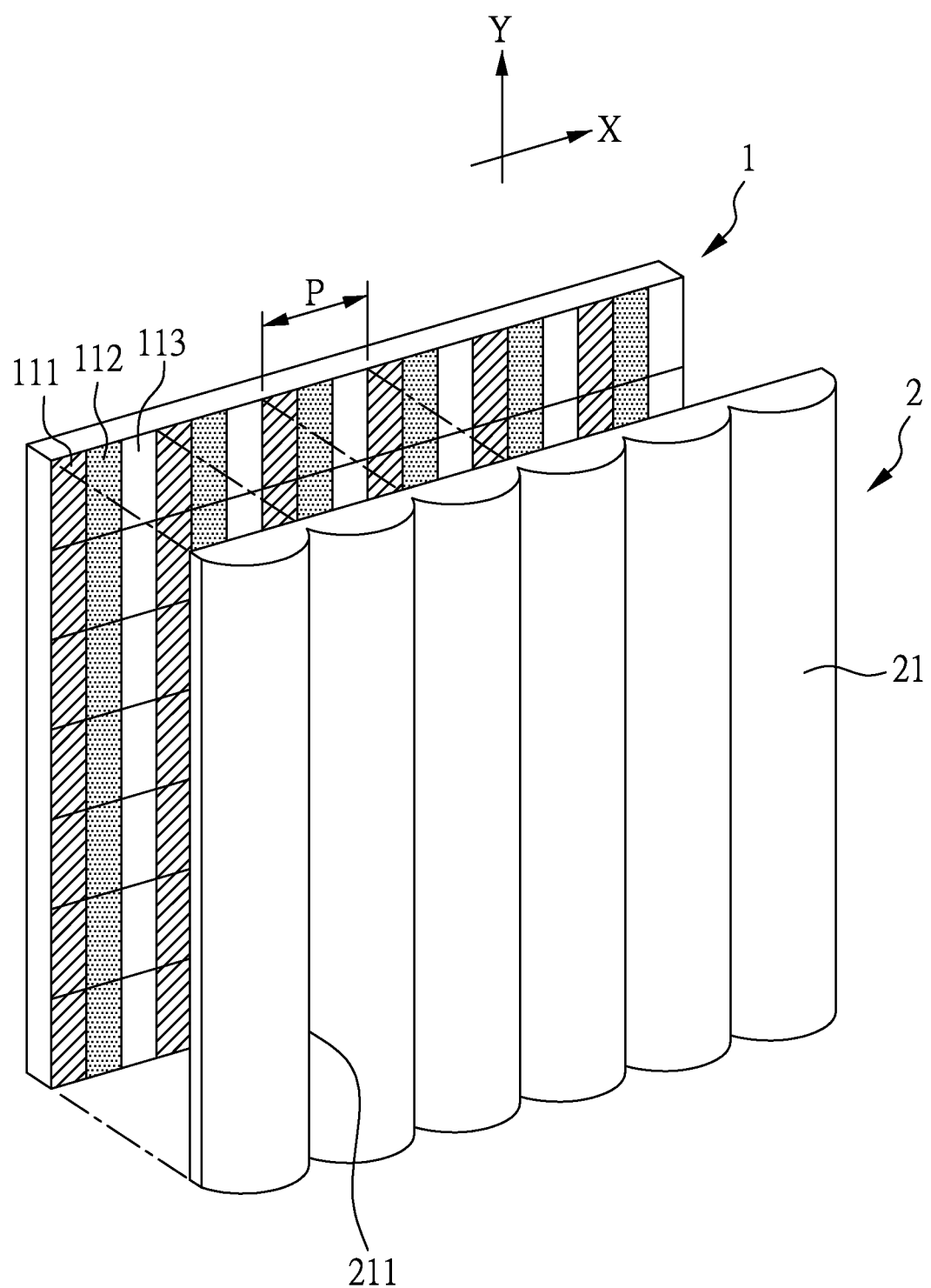
FIG. 1A is a perspective view of a display panel and lenticular lens of a 3D display device according to one embodiment of the present disclosure.

FIG. 1A is a perspective view of a display panel and modulating unit of an autostreoscopic 3D display device of one embodiment; and FIG. B is a perspective view of a TFT substrate of the display panel of the embodiment.

Figure 1B:
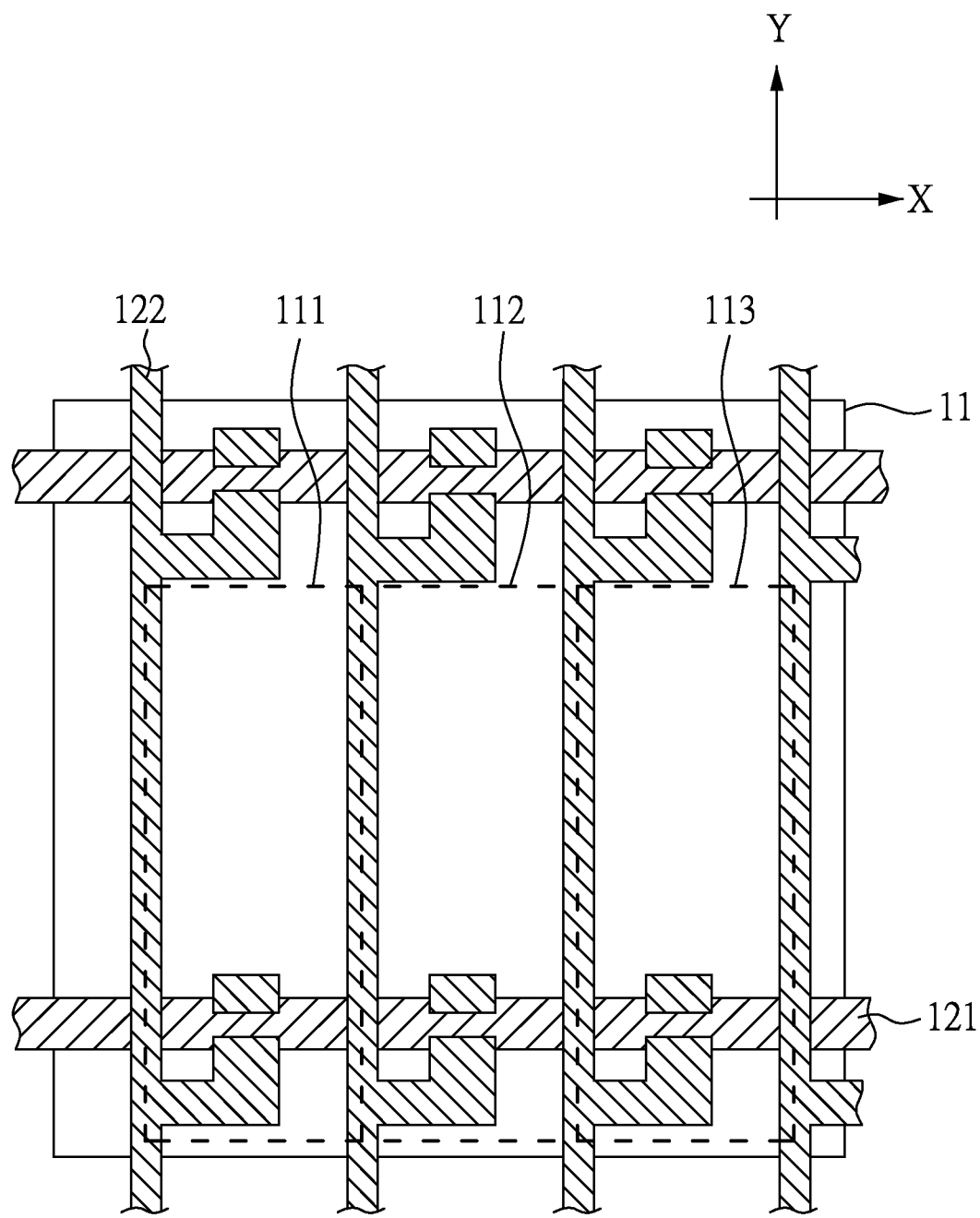
FIG. 1B is a perspective view of a thin film transistor (TFT) substrate of a display panel according to one embodiment of the present disclosure.

As shown in FIG. 1A, the main components for constituting the 3D display device of the present comparative embodiment include: a display panel 1; a backlight unit (not shown in the figure) disposed adjacent to the display panel 1; and a modulating unit 2 (lenticular lens array or barrier array) disposed on the display panel 1 and comprising plural columnar elements 21. In the embodiment, the columnar elements are lens. In other embodiment, the columnar elements are barrier. The modulating unit 2 could be disposed between the observer and the display panel 1, or the modulating unit 2 could be disposed between the display panel 1 and the backlight unit. The display panel 1, backlight unit, and the modulating unit 2 have gaps therebetween. In addition, as shown in FIG. 1B, the display panel of the embodiment at least comprises a TFT substrate, which comprises: a substrate 11; plural horizontal electrode lines 121 disposed on the substrate 11 and substantially arranged in parallel; and plural vertical electrode lines 122 disposed on the substrate 11 and substantially arranged in parallel, wherein the vertical electrode lines 122 cross the horizontal electrode lines 121 to define plural pixel units 111, 112, 113 arranged in an array. When a color filter layer (not shown in the figure) is disposed on the TFT substrate, the pixel units 111, 112, 113 can display different colors, as shown in FIG. 1A. In other embodiment, if the display panel 1 is an organic light emitting diode display (OLED) or a mono color display, there is no color filter layer.

As shown in FIGS. 1A and 1B, in the embodiment, the columnar elements 21 and the vertical electrode lines 122 are arranged in parallel. More specifically, the boundaries 211 between two adjacent columnar elements 21 or the longitudinal axes of the columnar elements 21 are parallel to the extension directions of the vertical electrode lines 122, wherein the extension directions of the vertical electrode lines 122 are defined as a vertical direction Y and the extension directions of the horizontal electrode lines 121 are defined as a horizontal direction X.

Figure 2:
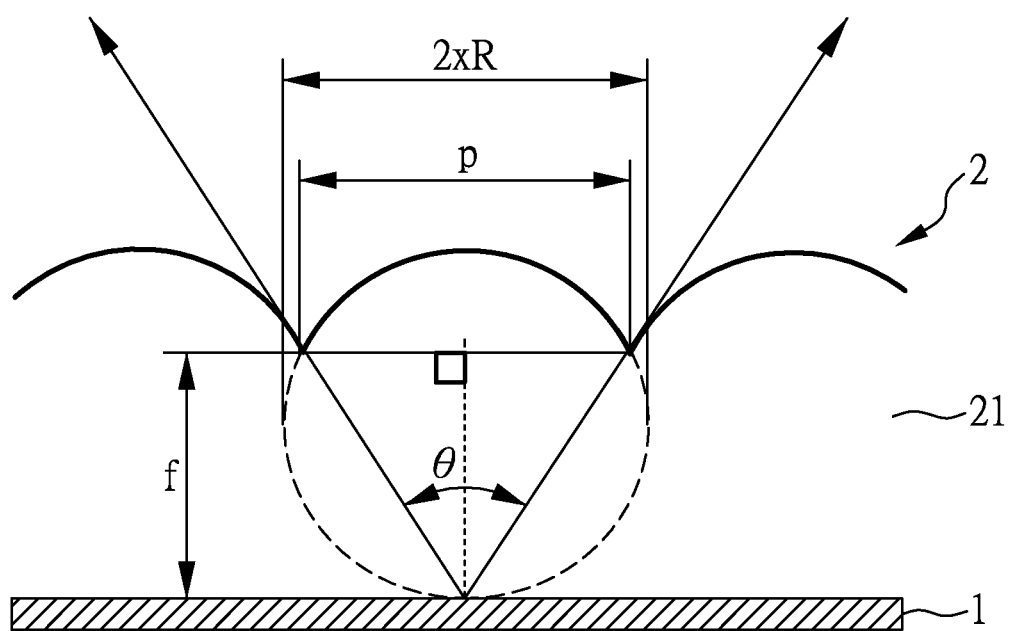
FIG. 2 is a cross-sectional view of a display panel and lenticular lens of a 3D display device according to one embodiment of the present disclosure.

FIG. 2 is a cross-sectional view of a display panel and modulating unit of the 3D display device of the embodiment. Herein, in order to achieve the purpose of displaying 3D image by using the 3D display device of the embodiment, three equations represented by the following equations (I-1) to (I-3) in terms of the optical design have to be considered.

$$\theta = 2\tan^{-1}\left(\frac{p/2}{f}\right) \tag{I-1}$$

$$R = f(n-1) \tag{I-2}$$

$$p \leq 2R \tag{I-3}$$

In the equations (I-1) to (I-3), θ refers to lens field of view (FOV); p refers to the lens pitch of the columnar element 21 shown in FIG. 2; f refers to the focal length of the columnar element 21; n refers to the refractive index of the lens type of modulating unit 2; and R refers to the lens radius of the columnar element 21.

From the above equations (I-1) to (I-3), in the case that the modulating unit 2 is made of UV resins and has the refractive index of 1.5-1.6, the estimated FOV (θ) can be represented by the following equation (I-4).

$$\theta \leq 2\tan^{-1}(n-1) \approx 53° \sim 62° \tag{I-4}$$

In the 3D display device of the embodiment, the viewing angle is the FOV of the modulating unit 2 shown in FIG. 2. As shown in the above equation (I-4), the estimated FOV of the modulating unit 2 is in a range from 53 degree to 62 degree; thus, the probable maximum 3D viewing angle of the 3D display device is around 60 degree.

Figure 3:
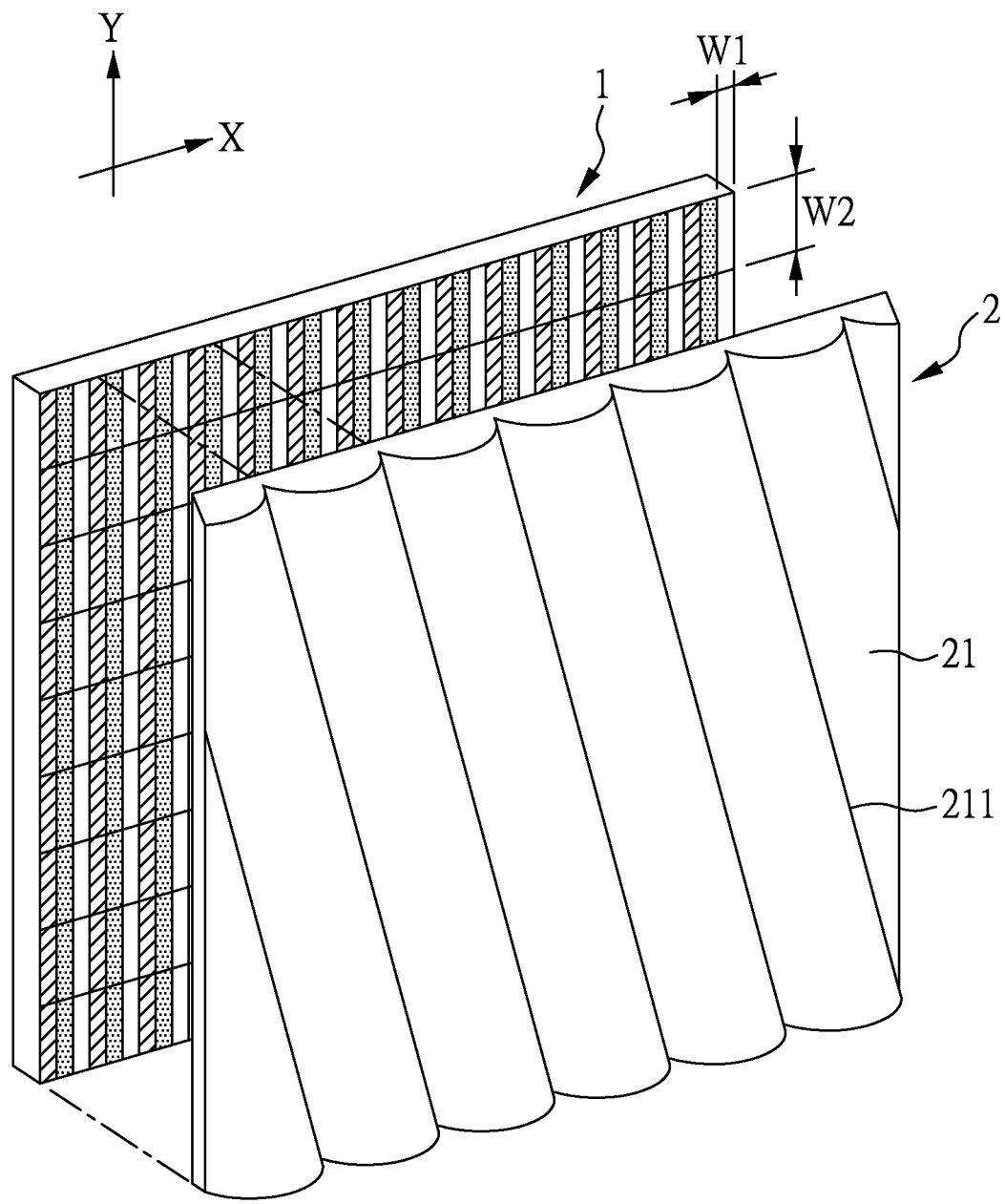
FIG. 3 is a perspective view of a display panel and lenticular lens of a 3D display device according to one embodiment of the present disclosure.
Figure 4:
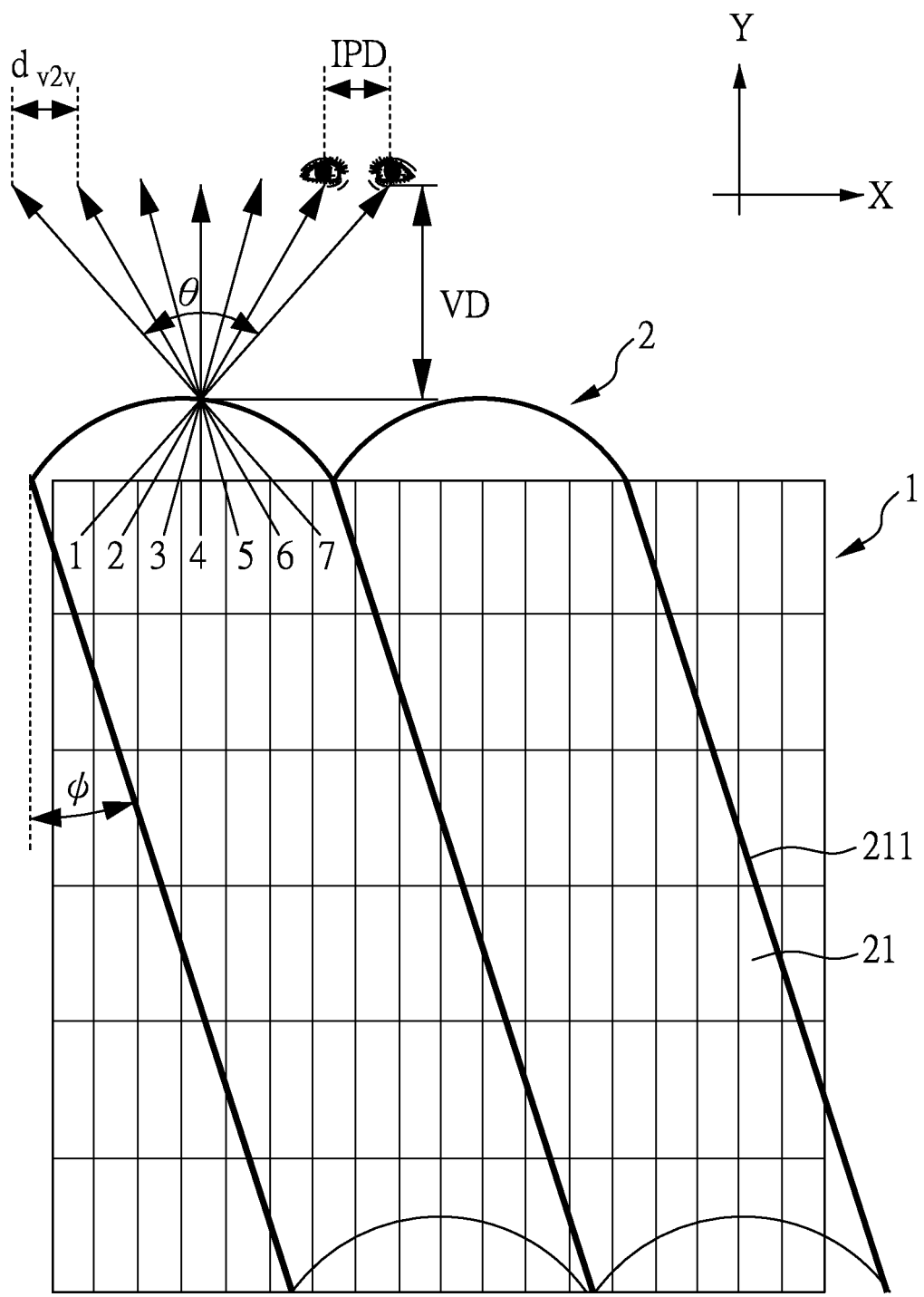
FIG. 4 is a perspective view showing lenticular lens on pixel units in a 3D display device according to one embodiment of the present disclosure.

FIG. 3 is a perspective view of a display panel and modulating unit of an autostreoscopic display device of the other one embodiment; and FIG. 4 is a perspective view showing modulating unit on pixel units in a 3D display device, wherein the numbers 1 to 7 refer to the view number. In the embodiment, the TFT substrate of the display panel is identical to that of prior embodiment shown in FIG. 1B. Herein, the 3D display device of the embodiment is similar to that illustrate in prior embodiment, except the following differences.

As shown in FIGS. 3 and 4, one difference is that the columnar elements 21 are slanted at a slant angle φ to an extension direction of the vertical electrode lines 122 (shown in FIG. 1B) of the display panel 1, wherein the extension directions of the vertical electrode lines 122 are defined as a vertical direction Y. More specifically, the columnar elements 21 are lens, the longitudinal axes and the focal lines thereof are parallel to the boundaries 211 thereof; therefore, in FIG. 4, the slant angle φ is represented by the included angle between the boundary 211 and the vertical direction Y represented by the dot line. Herein, the slant angle φ is in a range from 0 degree to 30 degree (0°<φ≤30°). By using the 3D display device of the embodiment, the 3D effect can be observed in the horizontal direction X.

The density of the pixel units in the horizontal direction X is higher than that in the vertical direction Y, to obtain the reduced 3D crosstalk between each parallax views and jumping phenomenon between boundary views transition.

In order to achieve the purpose of displaying 3D image by using the 3D display device of the embodiment, the following equations (II-1) and (II-2) have to be considered.

$$\theta = 2\tan^{-1}\left[\frac{d_{v2v}(N_{view}-1)/2}{VD}\right] \quad \text{(II-1)}$$

$$d_{v2v} \le IPD \quad \text{(II-2)}$$

In the equations (II-1) and (II-2), θ refers to FOV; $d_{v2v}$ refers to the view to view distance shown in FIG. 4; $N_{view}$ refers to number of views, wherein $N_{view}$ is 7 views in the 3D display device shown in FIG. 4; VD refers to the viewing distance between the 3D display device and the user (observer); and IPD refers to the interpupillary distance of the user (observer).

Figure 5:
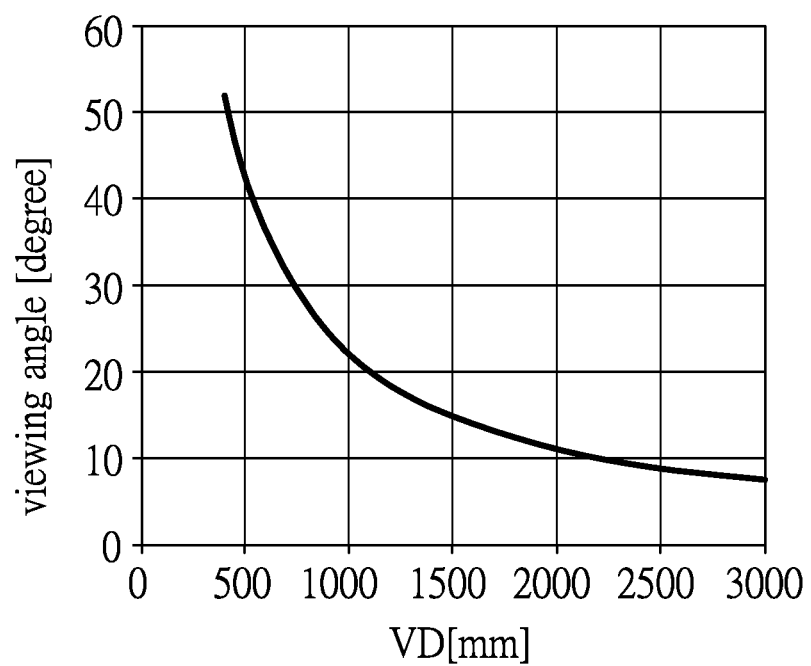
FIG. 5 is a diagram showing the relation of the viewing angle vs. the viewing distance by using a 3D display device according to one embodiment of the present disclosure.

In the case that the view to view distance ($d_{v2v}$) is equal to the interpupillary distance of the user (IPD) (In general, human being's IPD is about 65 mm) and the number of views ($N_{view}$) is 7 views, a simulation result of the relation of the viewing angle vs. the viewing distance is shown in FIG. 5.

As shown in FIG. 5, the maximum 3D viewing angle of the 3D display device of the prior embodiments are less than 60 degree. Especially, as the viewing distance of the user is increased, the viewing angle is greatly decreased. In addition, for the 3D display device of the prior embodiments, the number of views is fixed and cannot be adjusted according to the user's request.

Figure 6A:
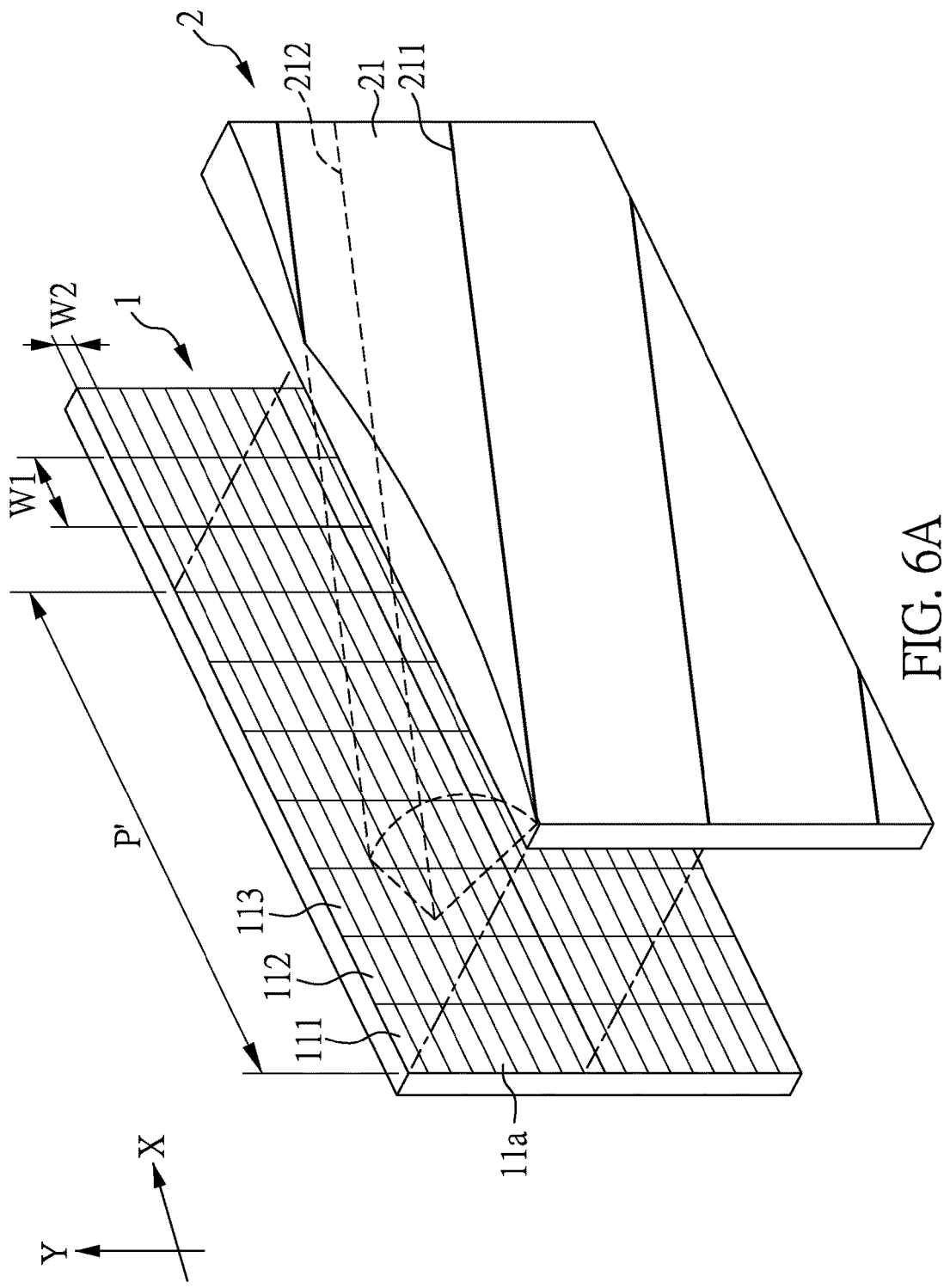
FIG. 6A is a perspective view of a display panel and lenticular lens of a 3D display device according to one embodiment of the present disclosure.
Figure 6B:
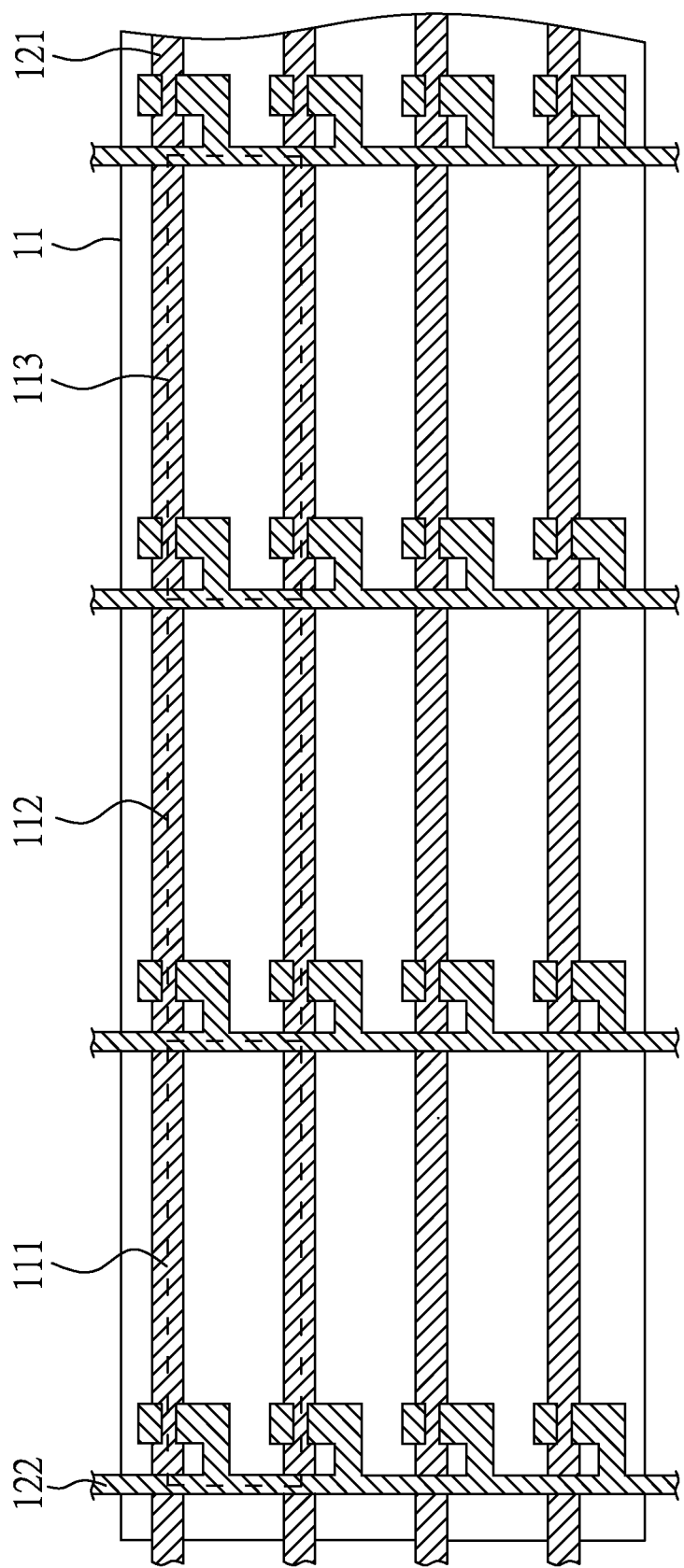
FIG. 6B is a perspective view of a TFT substrate of a display panel according to one embodiment of the present disclosure.
Figure 7:
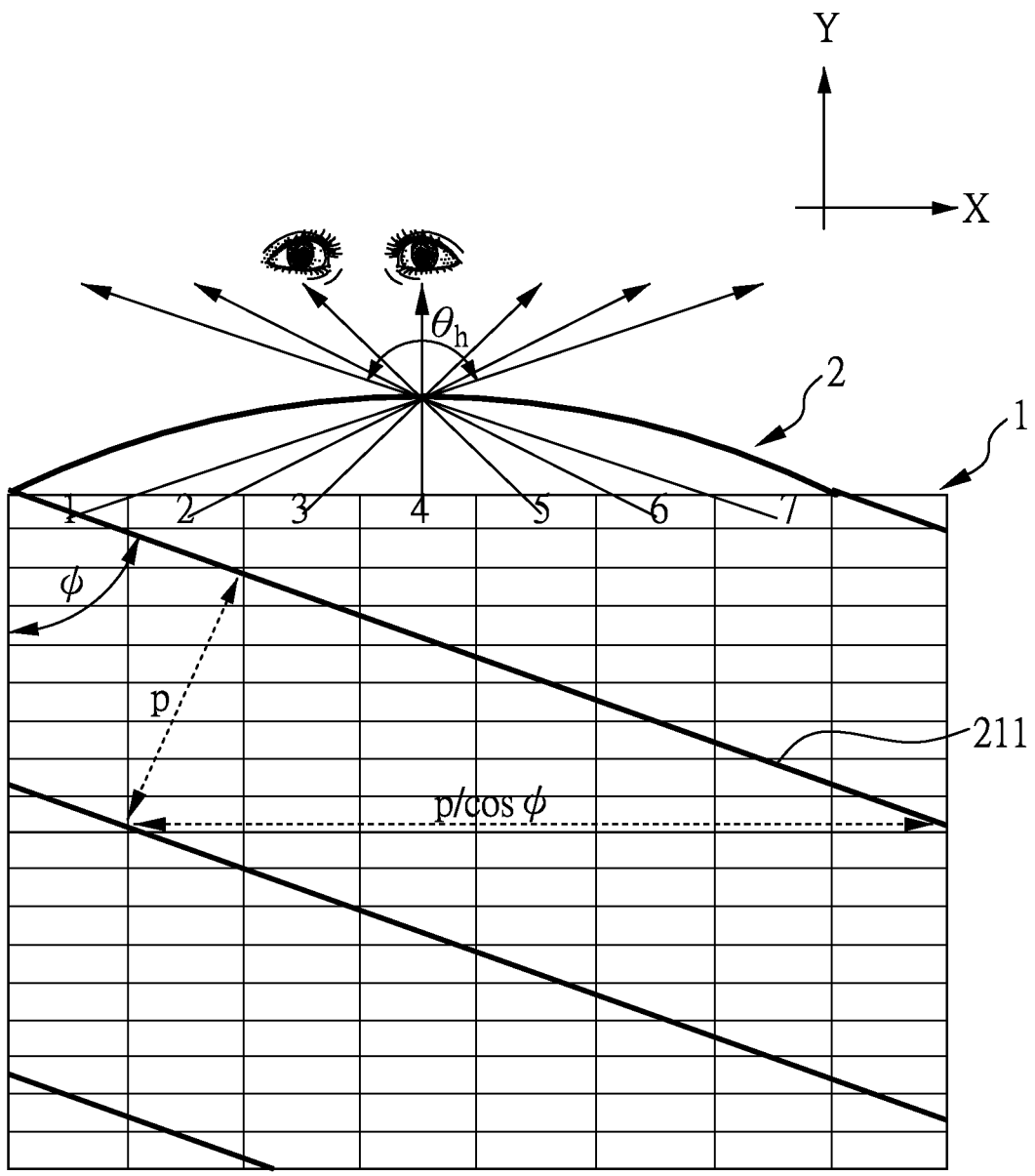
FIG. 7 is a perspective view showing lenticular lens on pixel units in a 3D display device according to one embodiment of the present disclosure.

FIG. 6A is a perspective view of a display panel and modulating unit of an autostreoscopic 3D display device of the other one embodiment; FIG. 6B is a perspective view of a TFT substrate of the display panel; and FIG. 7 is a perspective view showing lenticular lens on pixel units in a 3D display device, wherein the numbers 1 to 7 refer to the view number.

As shown in FIG. 6A, the main components for constituting the 3D display device of the present embodiment include: a display panel 1; and modulating unit 2 as a columnar optical director means (lens or barrier) disposed on the display panel 1 and comprising plural columnar elements 21. Herein, the columnar optical director means suitable for the present embodiment can be the lenticular lens array as shown in FIG. 6A, a parallax barrier, a LC GRIN lens cell or a stripe light guide that comprising stripe light directors and/or light sources and disposed under the display panel. In addition, as shown in FIG. 6A, the columnar elements 21 have focal lines 212, which locate on plans 11a of the pixel units 111, 112, 113.

As shown in FIG. 6B, the display panel of the present embodiment at least comprises a TFT substrate, which comprises: a substrate 11; plural horizontal electrode lines 121 disposed on the substrate 11 and substantially arranged in parallel; and plural vertical electrode lines 122 disposed on the substrate 11 and substantially arranged in parallel, wherein the vertical electrode lines 122 cross the horizontal electrode lines 121 to define plural pixel units 111, 112, 113 arranged in an array. When a color filter layer (not shown in the figure) is disposed on the TFT substrate, the pixel units 111, 112, 113 can display different colors, as shown in FIG. 6A.

In the present embodiment, the detail structure of the display panel 1 is not particularly described, and can be any display panel known in the art. For example, the display panel 1 of the present embodiment may comprise other components, such as a color filter layer, a black matrix layer, electrode layers, a display medium layer and so on, to achieve the purpose of image display; but the present disclosure is not limited thereto. The display medium layer of the present embodiment can be a liquid crystal layer, an organic light emitting diode layer or an inorganic light emitting diode layer. When the display medium layer is the liquid crystal layer, a backlight module can further be disposed below the TFT substrate.

In the present embodiment, as shown in FIGS. 6A and 7, the columnar elements 21 are slanted at a slant angle φ to an extension direction of the vertical electrode lines 122 (shown in FIG. 6B) of the display panel, wherein the extension directions of the vertical electrode lines 122 are defined as a vertical direction Y. More specifically, the columnar elements 21 are lens, the longitudinal axes and the focal lines thereof are parallel to the boundaries 211 thereof; therefore, in FIG. 7, the slant angle φ is represented by the included angle between the boundary 211 and the vertical direction Y which is equivalent to the column direction of the array of the pixel units. In the present embodiment, the slant angle φ may be in a range from 60 degree to 85 degree, and preferably is in a range from 70 degree to 80 degree. One feature of the 3D display device of the present embodiment is that the slant angle φ in the 3D display device of the present embodiment is much larger than that of prior embodiment.

In order to achieve the purpose of displaying 3D image by using the 3D display device of the present embodiment, the following equations (III-1) and (III-2) have to be considered.

$$\theta_h = 2\tan^{-1}\left(\frac{(p/\cos\phi)/2}{f}\right) \quad \text{(III-1)}$$

-continued $$\theta_v = 2\tan^{-1}\left(\frac{(p/\sin\phi)/2}{f}\right) \tag{III-2}$$

In the equations (III-1) and (III-2), $\theta_h$ refers to the FOV in the horizontal direction X shown in FIG. 7; $\theta_v$ refers to the FOV in the vertical direction Y; f refers to the focal length of the columnar element 21; φ refers to the slant angle of the columnar element 21; and p refers to the lens pitch of the columnar element 21 in a direction vertical to the axis of the columnar element 21.

From the above equations (III-1) and (III-2) as well as the equations (I-2) and (I-3) in Comparative embodiment 1, in the case that the modulating unit 2 is made of UV resins and has the refractive index of 1.5-1.6, the estimated FOV in the horizontal direction X ($\theta_h$) is larger than 80 degree.

In addition, the ratio of the estimated FOV in the horizontal direction X ($\theta_h$) to the estimated FOV in the vertical direction ($\theta_v$) can be close to an aspect ratio of the display device, for example 16:9; and this result indicates that the 3D display device of the present embodiment is suitable for the commercialized widescreen (16:9) display device, such as monitors and televisions.

In addition, as shown in FIGS. 6A to 7, the widths W1 of the pixel units 111, 112, 113 along extension directions of the horizontal electrode lines 121 (i.e. the horizontal direction X) can be equal to or larger than the widths W2 of the pixel units 111, 112, 113 along extension directions of the vertical electrode lines 122 (i.e. the vertical direction Y). In the present embodiment, the widths W1 of the pixel units 111, 112, 113 along extension directions of the horizontal electrode lines 121 (i.e. the horizontal direction X) is larger than the widths W2 of the pixel units 111, 112, 113 along extension directions of the vertical electrode lines 122 (i.e. the vertical direction Y). However, in Comparative embodiment 2, the widths W2 of the pixel units 111, 112, 113 along extension directions of the vertical electrode lines 122 (i.e. the vertical direction Y) is larger than the widths W1 of the pixel units 111, 112, 113 along extension directions of the horizontal electrode lines 121 (i.e. the horizontal direction X).

Herein, the 3D display devices of prior embodiment and the present embodiment are compared to understand the relations between the viewing angle and the slant angle of the lenticular lens through simulations. For the 3D display device of prior embodiment, as shown in FIG. 3, the widths W1 of the pixel units 111, 112, 113 along extension directions of the horizontal electrode lines 121 (i.e. the horizontal direction X) to the widths W2 of the pixel units 111, 112, 113 along extension directions of the vertical electrode lines 122 (i.e. the vertical direction Y) is 1:3. For the 3D display device of the present embodiment, as shown in FIG. 6A, the widths W1 of the pixel units 111, 112, 113 in the horizontal direction X to the widths W2 of the pixel units 111, 112, 113 in the vertical direction Y is 3:1. In the stimulations, the view mixing ratio refers to a ratio of the number of the parallax views (i.e. the seeing pixel units), which are present on the focal plane of the lens, to the number of whole views (i.e. the whole pixel units). The view mixing ratio of 100% means no stereoscopic perception, and one eye sees the whole parallax views simultaneously. Hence, as the view mixing ratio increased, the crosstalk effect is increased; and this indicates the worse 3D effect.

Figure 8:
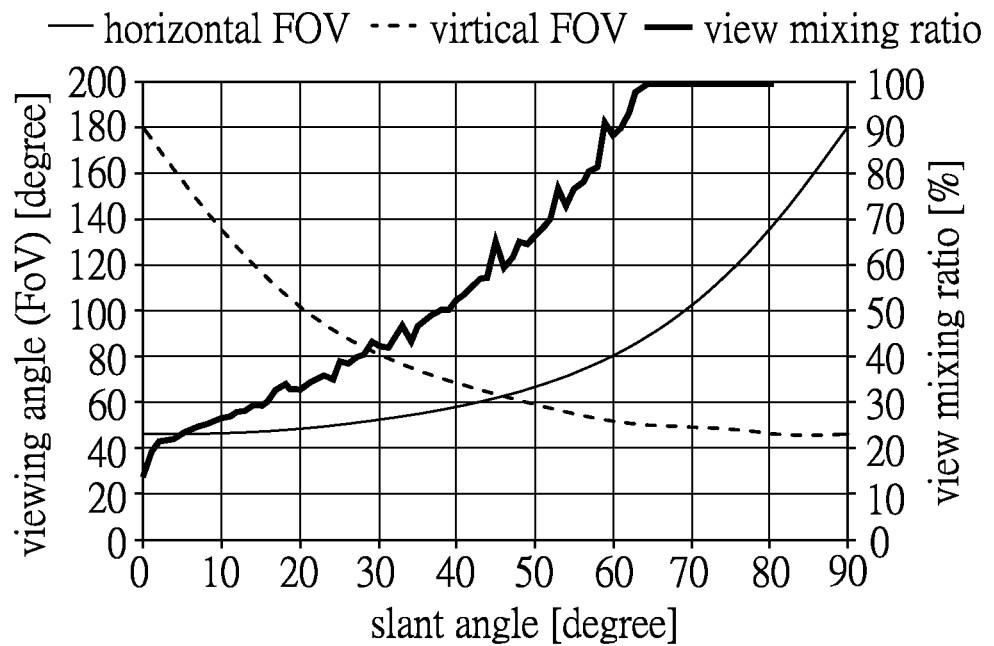
FIG. 8 is a diagram showing the relation of the viewing angles in the horizontal/vertical directions and the view mixing ratio vs. slant angles of the lenticular lens by using a 3D display device according to one embodiment of the present disclosure.

FIG. 8 is a diagram showing the relation of the viewing angles in the horizontal/vertical directions and the view mixing ratio vs. slant angles of the lenticular lens by using the 3D display device of prior embodiment. As shown in FIG. 8, as the slant angle of the lenticular lens is increased, the FOV in the horizontal direction (i.e. "horizontal FOV" in the figure) is increased, but the FOV in the vertical direction (i.e. "vertical FOV" in the figure) is decreased. In addition, when the slant angle is greater than 40 degree, the view mixing ratio is too high, and large crosstalk effect is found. In order to obtain a desirable 3D effect, less view mixing ratio means less crosstalk effect, so the view mixing ratio cannot be too high. Thus, from the result shown in FIG. 8, the condition of the slant angle over 40 degree is useless, and the condition of the slant angle within 10 degree and 20 degree is suitable for the 3D display device of prior embodiment. For a user, the FOV in the horizontal direction is more important than the FOV in the vertical direction due to the possible viewing positions of the multiuser. However, when the slant angle is within 10 degree and 20 degree, the FOV in the horizontal direction is less than 60 degree.

Figure 9:
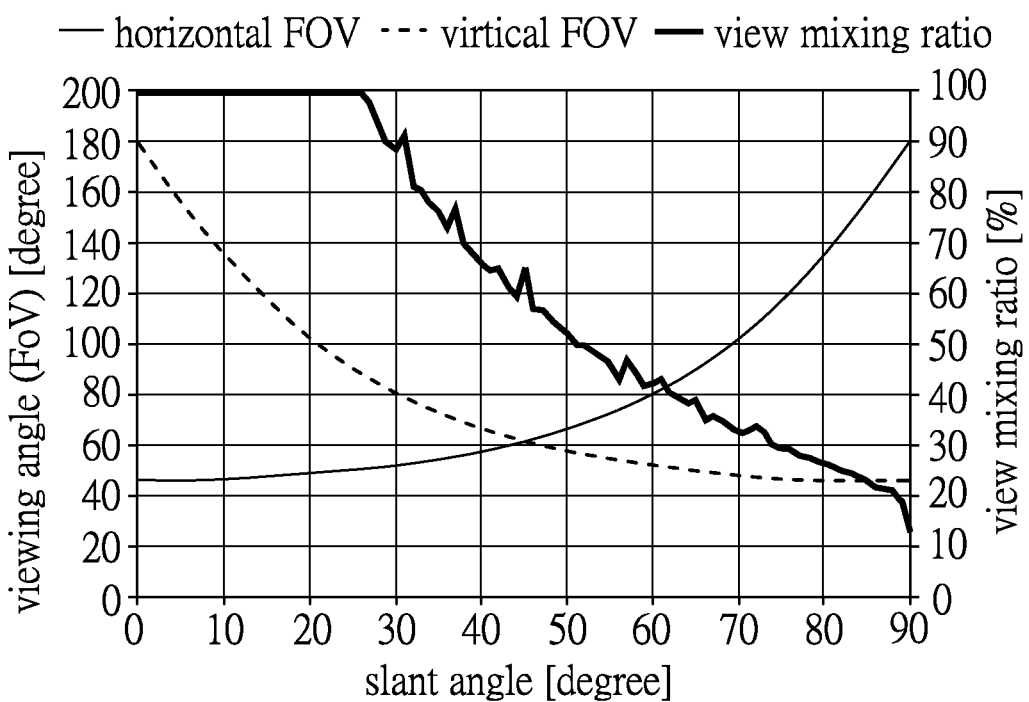
FIG. 9 is a diagram showing the relation of the viewing angles in the horizontal/vertical directions and the view mixing ratio vs. slant angles of the lenticular lens by using a 3D display device according to one embodiment of the present disclosure.

FIG. 9 is a diagram showing the relation of the viewing angles in the horizontal/vertical directions and the view mixing ratio vs. slant angles of the lenticular lens by using the 3D display device of the present embodiment. As shown in FIG. 9, as the slant angle of the lenticular lens is increased, the FOV in the horizontal direction (i.e. "horizontal FOV" in the figure) is increased, but the FOV in the vertical direction (i.e. "vertical FOV" in the figure) is decreased; and this result is similar to that found in FIG. 8. However, when the slant angle is increased, the view mixing ratio is decreased; and this result is contrary to that found in FIG. 8. In order to obtain a desirable 3D effect, less view mixing ratio means less crosstalk effect, so the view mixing ratio cannot be too high. Thus, from the result shown in FIG. 9, the condition of the slant angle over 60 degree has lower view mixing ratio; this result indicates that the slant angle should be more than 60 degree, preferably in a range from 60 degree to 85 degree, and more preferably in a range from 70 degree to 80 degree. In addition, in the case that the slant angle is more than 60 degree, wide viewing angle (FOV) in the horizontal direction can be achieved. In the 3D display device of the present embodiment, when the slant angle is properly adjusted, the viewing angle (FOV) can be larger than 80 degree; and preferably is in a range from 80 degree to 160 degree. For example, when the slant angle is 60 degree, the viewing angle in the horizontal direction is around 80 degree; and when the slant angle is 80 degree, the viewing angle in the horizontal direction can be more than 120 degree.

Comparing the results shown in FIGS. 8 and 9, the viewing angle in the horizontal direction is more than 80 degree for the 3D display device of the present embodiment. In addition, for the 3D display device of the present embodiment, since large viewing angles in the horizontal direction can be achieved, the viewing angles in both the horizontal and vertical directions can be optimized. In order to achieve better 3D effect, the viewing angle in the horizontal direction is preferably larger than that in the vertical direction.

In addition, in the 3D display device of the present embodiment, when the viewing angles in both the horizontal and vertical directions are optimized (for example, the slant angle is in a range from 70 degree to 80 degree), the viewing angle in the horizontal direction can be wider than that in the vertical direction, and the ratio of the viewing angle in the horizontal direction to that in the vertical direction is approximately 16:9. Therefore, the 3D display device of the present embodiment can well match with the commercialized viewing scenes, for example, monitors and televisions.

Furthermore, as shown in FIGS. 6A and 7, one eye, through the lenticular lens array 2, simultaneously sees a set of pixel units (for example, the pixel units indicated by the numbers 1 to 7 shown in FIG. 7) only on the focal lines 212 of the columnar elements 21. As mentioned above, the view mixing ratio is referred to the ratio of the seeing pixel units to the whole pixel units. When the user initially observe the image displayed on the 3D display device of the present embodiment, a reconstructed image from a first set of the pixel units corresponds to a first parallax view of 3D images.

On the other hand, another eye sees different sets (herein, called as the second set) of the pixel units on slightly shifted focal lines; thus, a reconstructed image from the second set of the pixel units corresponds to a second parallax view of 3D images, wherein the second parallax view is a different parallax view from the first parallax view at the initial eye position. Thus, the correct 3D recognition based on binocular view disparity is reconstructed in user's brain.

In addition, as shown in FIGS. 6A and 9, when the widths W1 of the pixel units 111, 112, 113 in the horizontal direction X to the widths W2 of the pixel units 111, 112, 113 in the vertical direction Y is 3:1, less view mixing ratio, namely more preferable 3D effect, can be achieved. Hence, for the 3D display device of the present embodiment, the widths W1 of the pixel units 111, 112, 113 in the horizontal direction X can be equal to or larger than the widths W2 of the pixel units 111, 112, 113 in the vertical direction Y, for example, the ratio of the widths W1 to the widths W2 can be 3:1, 4:1, 2:1 or 1:1. Preferably, the widths W1 in the horizontal direction X is larger than the widths W2 in the vertical direction.

FIGS. 10A to 10D are perspective views showing possible arrangements of the pixel units in the 3D display device of the present embodiment, wherein the letters R, G, B, W respectively refer to the red, green, blue and white pixel units. FIGS. 10A to 10D respectively represent examples that the ratios of the widths W1 to the widths W2 (as shown in FIG. 6A) is 3:1, 4:1, 2:1 and 1:1. However, in other embodiments of the present disclosure, the ratio of the width W1 to the width W2 and the arrangement of the different color pixel units are not limited to the examples shown in FIGS. 10A to 10D. In addition, the white pixel units shown in FIGS. 10B to 10D may also be replaced by yellow pixel units, but the present disclosure is not limited thereto.

As shown in FIGS. 6A and 7, the columnar elements 21 can provide repeating blocks of the pixel units, and each of the repeating blocks may respectively comprise at least one pixel units. In this case, the columnar elements 21 can provide repeating blocks of the pixel units indicated by the numbers 1 to 7, so each of the repeating blocks respectively comprise 7 adjacent pixel units. In this case, the number of the views can be 7 views. FIG. 11 is a perspective view showing another case of the repeating blocks of the pixel units in the 3D display device of the present disclosure. As shown in FIGS. 6A and 11, the columnar elements 21 can provide repeating blocks of the pixel units indicated by the numbers 1 to 32, so each of the repeating blocks may respectively comprise 32 adjacent pixel units. In this case, the number of the views is 32 views. Herein, FIGS. 7 and 11 only provide examples showing the repeating blocks of the pixel units, but the present disclosure is not limited thereto.

Figure 12:
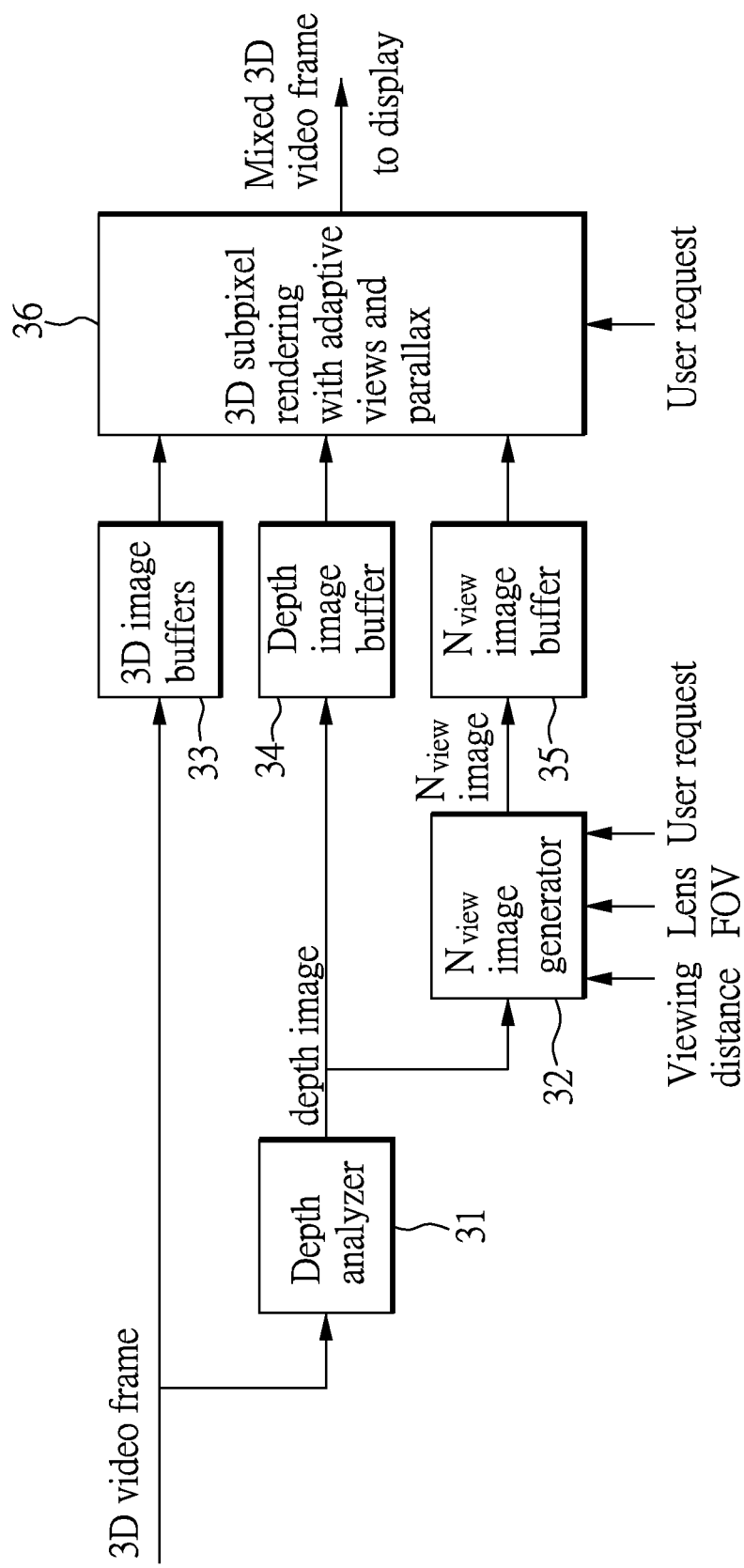
FIG. 12 is a perspective view showing an imaging rendering circuit used in the 3D display device according to one embodiment of the present disclosure.

In order to achieve the purpose of temporally or spatially adjusting the number of the views according to the user's request without changing the arrangement and the structure of the display panel and the columnar optical director means, the 3D display device of the present embodiment may further comprise an imaging rendering circuit, which is shown in FIG. 12. The imaging rendering circuit used in the 3D display device of the present embodiment comprises: a 3D image buffer 33, receiving a 3D video frame and outputting a 3D image data; a depth analyzer 31, receiving the 3D video frame and outputting a depth image; a depth image buffer 34, connecting to the depth analyzer 31, receiving the depth image and outputting a depth data; a view number image generator 32 (Nview number image generator in FIG. 12), connecting to the depth analyzer 31, receiving the depth image and outputting an N view number image data; a view number image buffer 35 (Nview number image buffer in FIG. 12), connecting to the view number image generator 32, receiving the N view number image data and outputting the N view number image data; and a 3D pixel rendering means 36, connecting to the 3D image buffer 33, the depth image buffer 34 and the view number image buffer 35, receiving the 3D image data, the depth data and the view image number data, and outputting a mixed 3D video frame to the display panel 1 shown in FIG. 6A.

As shown in FIG. 12, the 3D video frame can be a 3D-side by side-LR video frame, a multiview video frame, or a 2D plus depth video frame. When the 3D video frame signal is input, it is temporarily stored in the 3D image buffer 33 and also transmitted to the depth analyzer 31. When the depth analyzer 31 receives the 3D video frame signal, it can output the depth image to the view number image generator 32 and the depth image buffer 34. The depth image buffer 34 can temporarily store the depth image. The view number image generator 32 can process the depth image, further receives a signal related to a viewing distance, which is a distance between a user and the 3D display device, and may further receives a request signal from the user to decide the 3D effect (such as display quality) being displayed on the display panel. After the view number image generator 32 receive the data of the depth image, the viewing distance and the request signal from the user, the view number image generator 32 can output the N view image data with N view image data based on the FOV of the modulating unit 2 shown in FIG. 6A.

The 3D image buffer 33 can process the stored 3D video frame signal stored and output a 3D image data; the depth image buffer 34 can store the depth image and output a depth data; and the view number image buffer 35 can store the N view number image data and output the N view number image data. After the 3D pixel rendering means 36 receives and processes the above 3D image data, depth data and the N view number image data based on the user's request (such as the desired 3D effect), a mixed 3D video frame can be displayed on the display panel. Herein, the user can input a request signal to the view number image generator 32 and/or the 3D pixel rendering means 36, to decide the 3D effect (such as image depth, 3D resolution and so on) being displayed on the display panel.

Hence, in the 3D display device of the present embodiment, through the imaging rendering circuit, the number of views can be temporally or spatially adjusted according to the user's request without changing the arrangement and the structure of the display panel and the columnar optical director means. In the 3D display device of the present embodiment, the number of views can be adjusted according to the depth of the input 3D video frame, the user's request and other information from the input device through the imaging rendering circuit.

Figure 13A:
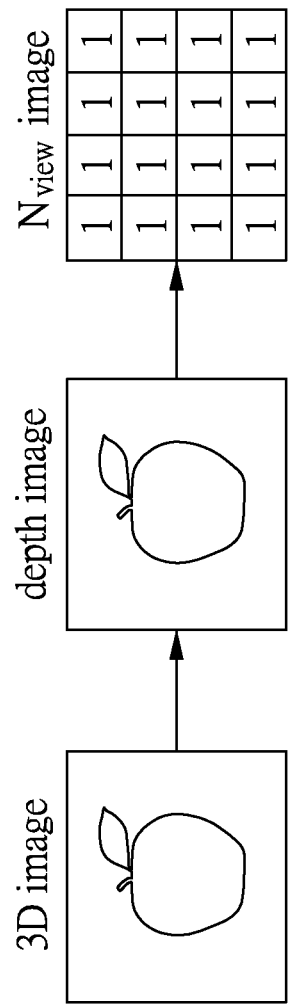
FIGS. 13A to 13C are perspective views showing the relation between the number of views and the depth according to one embodiment of the present disclosure.
Figure 13B:
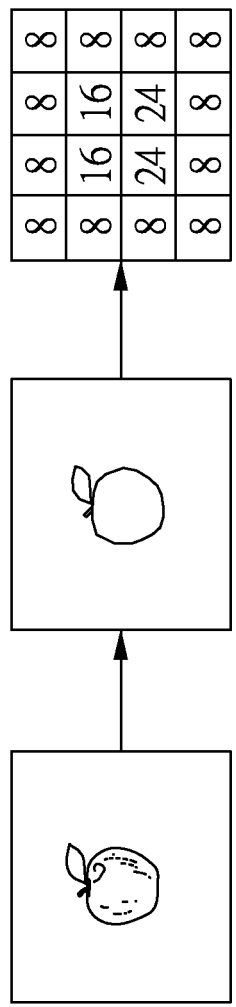
Figure 13C:
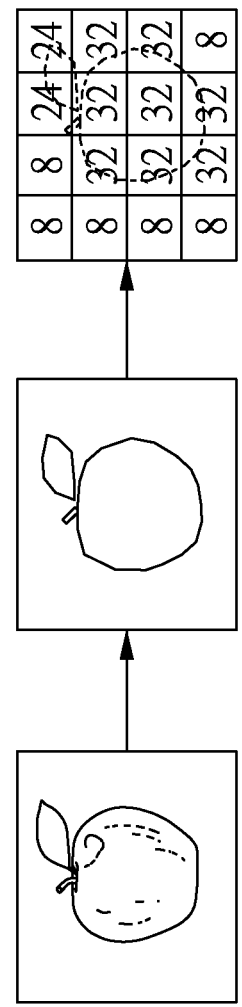

FIGS. 13A to 13C are perspective views showing the relation between the number of views and the depth, wherein the left ones are the 3D image frames, the middle ones are the depth images, and the right ones are schematic diagrams showing possible number of views. As shown in FIG. 13A, if the user only want a 2D image, only 1 view is required, and the view number image generator 32 can finish the computation in a short time with low power consumption. As shown in FIG. 13B, when a shallow depth is required, medium number of views (such as 16 and 24 views) is required in some area, and small number of views (such as 8 views) is required in other area; in this case, the time and power for the computation are more than the case of FIG. 13A. As shown in FIG. 13C, when a deep depth is required, large number of views (such as 32 views) is required in some area to provide smooth and natural quality of 3D images; in this case, the time and power for the computation are more than the case of FIG. 13B.

Hence, as the depth images are temporally or spatially varied, the view number image generator 32 flexibly adopts optimum smaller or larger number of views to provide smooth and natural quality of 3D images; then the variable number of views can be obtained by the view number image generator 32 according to the user's demands, as the results, the computation time or power consumption in the imaging rendering circuit can be optimized.

In addition, since depth information with regard to each views is assigned to each sub-pixels of the display effectively, the view number image generator 32 output the N view image data being formatted as 16 blocks composed of horizontal 4 multiplied by vertical 4 units in the whole display screen area as shown in FIGS. 13A, 13B and 13C. But it is not limited into 16 blocks. It can be arbitrary numbers of blocks for a desirable 3D system hardware configuration.

Figure 14:
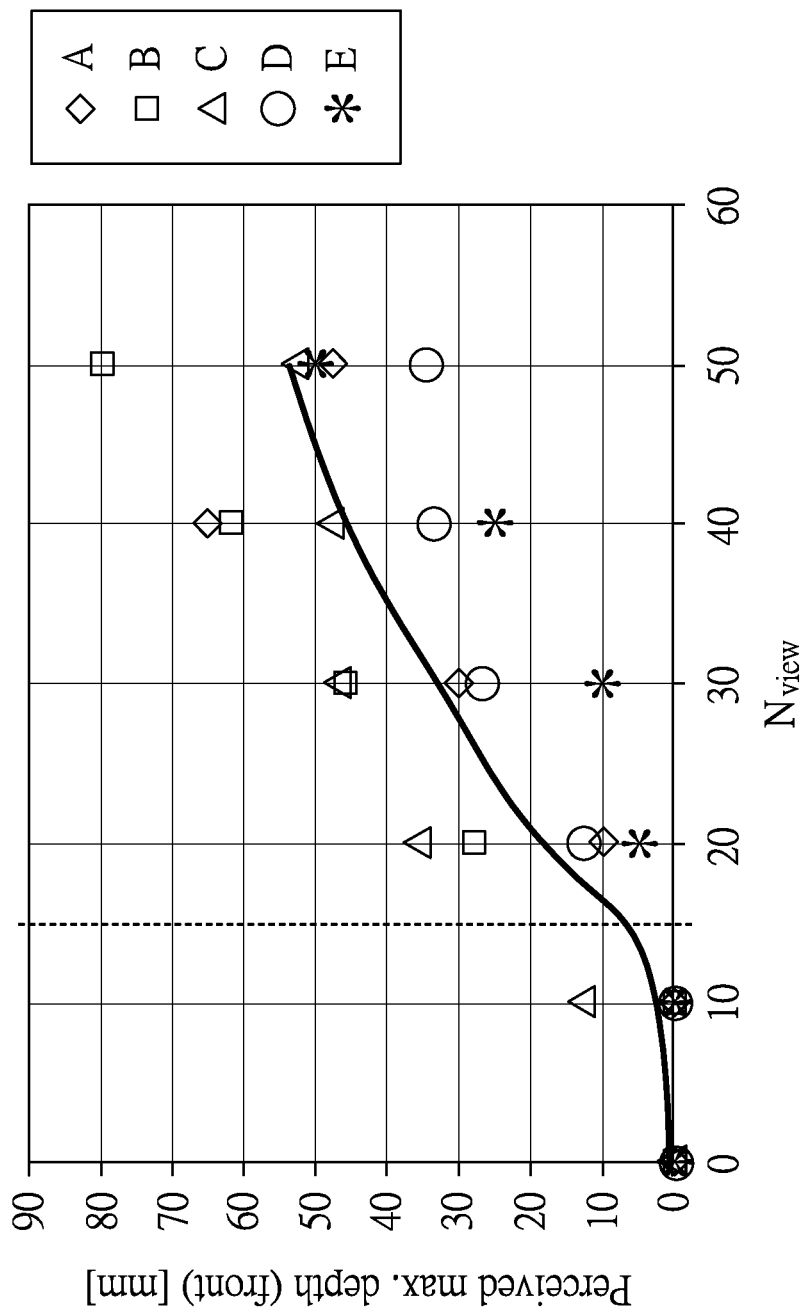
FIG. 14 is a diagram showing the relation of the perceived maximum depth vs. number of views according to one embodiment of the present disclosure.

Furthermore the number of pixel units of an unit block exceeds at least maximum number of views of the N view image data, for example 32 views Herein, a 31.5 inch LCD with 4K resolution is used for the following test, and the FOV is 95 degree in the horizontal direction. The viewing distance is 1.5 in, and the test number of views is in a range from 10 views to 50 views. In this test, each subject uses both eyes. FIG. 14 is a result showing the relation of the perceived maximum depth vs. number of views in this test, wherein A, B, C, D and E refers to 5 subjects.

As shown in FIG. 14, larger number of views can provide larger depth perception in maximum for these 5 subjects; and only one of them can perceive the depth in the case of 10 views. This result indicates that the required number of views is at least 15 views, in order to obtain a desirable depth. Especially, when the number of views is more than 30 views, the depth perception is much more stable and wide range.

From the result of the above test, even though the view to view distance is larger than the interpupillary distance, he or she still can perceive the image depth, which indicates that the equation (II-2) does not have to be considered when using the 3D display device of the present embodiment.

In conclusion, the present disclosure provides a novel 3D display device, wherein the modulating unit has a specific slant angle to achieve the purpose of large viewing angle. In addition, the 3D display device of the present disclosure is further equipped with an imaging rendering circuit; thus, the number of views can be adjusted to obtain 3D images with desirable depths.

In the present disclosure, the 3D display device can be applied to not only the monitors and televisions as mentioned above, but also other apparatus, such as cell phones, notebooks, video cameras, cameras, music players, navigation devices, and so on.

Furthermore, the present disclosure is described as multi-view type 3D display to achieve ultra wide viewing, but it is not limited into the multi-view type 3D display. The disclosure can be applied for an integral photography 3D or a light field 3D display.

Although the present disclosure has been explained in relation to its preferred embodiment, it is to be understood that many other possible modifications and variations can be made without departing from the spirit and scope of the disclosure as hereinafter claimed.

What is claimed is:

1. A display device, comprising:
a display panel, comprising:
a substrate;
plural horizontal electrode lines disposed on the substrate and substantially arranged in parallel; and
plural vertical electrode lines disposed on the substrate and substantially arranged in parallel, wherein the vertical electrode lines are interlaced with the horizontal electrode lines to define plural pixel units; and
a modulating unit disposed on the display panel and comprising plural columnar elements,
wherein the columnar elements are slanted at a slant angle to an extension direction of the vertical electrode lines, and the slant angle is in a range from 70 degree to 80 degree,
wherein a width of each of the pixel units along extension directions of the horizontal electrode lines is larger than a width of each of the pixel units along extension directions of the vertical electrode lines.

2. The display device of claim 1, wherein a ratio of the width of the pixel units along the extension directions of the horizontal electrode lines to the widths of the pixel units along the extension directions of the vertical electrode lines is 3:1, 4:1, or 2:1.

3. The display device of claim 1, wherein a field of view in a horizontal direction of the modulating unit is larger than 80 degree.

4. The display device of claim 1 wherein a ratio for a horizontal field of view and a vertical field of view of the modulating unit is 16:9.

5. The display device of claim 3, wherein the field of view of the modulating unit is in a range from 80 degree to 160 degree.

6. The display device of claim 1, wherein the modulating unit is a lenticular lens array, a parallax barrier, a LC GRIN lens cell or a stripe light guide.

7. The display device of claim 6, wherein the stripe light guide is divided into plural columnar parts comprising plural light sources, and the stripe light guide is disposed adjacent to the display panel.

8. The display device of claim 1, further comprising an imaging rendering circuit, which comprises:
an image buffer, receiving a video frame and outputting an image data;
a depth analyzer, receiving the video frame and outputting a depth image;
a depth image buffer, connecting to the depth analyzer, receiving the depth image and outputting a depth data;
a view number image generator, connecting to the depth analyzer, receiving the depth image and outputting an N view image data;
a view number image buffer, connecting to the view number image generator, receiving the N view image data and outputting the N view image data; and
a 3D pixel rendering means, connecting to the image buffer, the depth image buffer and the view number image buffer, receiving the image data, the depth data and the N view image data, and outputting a mixed 3D video frame to the display panel, wherein the view number of the N view image data is at least 15.

9. The display device of claim 8, wherein the 3D pixel rendering means further receiving a request signal from a user to decide a 3D effect being displayed on the display panel.

10. The display device of claim 8, wherein the view number image generator further receives a signal related to a viewing distance, which is a distance between a user and the 3D display device.

11. The display device of claim 8, wherein the view number image generator further receives a request signal from a user to decide a 3D effect being displayed on the display panel.

12. The display device of claim 8, wherein the N view image data is formatted as 16 blocks composed of 4 horizontal unit blocks and 4 vertical unit blocks.

13. The display device of claim 12, wherein the number of the pixel units for one of the unit block is at least 32.

14. The display device of claim 8, wherein the view number of the N view image data is from 15 to 50.

* * * * *